United States Patent

Partridge

[15] 3,652,874

[45] Mar. 28, 1972

[54] CIRCUIT FOR CONTROLLING THE CONDUCTION OF A SWITCHING DEVICE

[72] Inventor: Donald F. Partridge, 1036 Harlan Drive, San Jose, Calif. 95126

[22] Filed: July 30, 1970

[21] Appl. No.: 59,521

[52] U.S. Cl. ..........................307/252 M, 307/246, 307/265, 307/284, 321/5

[51] Int. Cl. ....................................H03k 17/04, H03k 17/72

[58] Field of Search ............307/252 G, 252 J, 252 L, 252 M, 307/246, 265, 271, 305; 321/5

[56] References Cited

UNITED STATES PATENTS

| | | | |
|---|---|---|---|
| 3,431,436 | 3/1969 | King | 307/246 X |
| 3,372,327 | 3/1968 | Morgan | 307/305 X |
| 3,376,492 | 4/1968 | Morgan et al. | 307/252 K X |
| 3,191,074 | 6/1965 | Carruthers | 307/104 |
| 3,242,352 | 3/1966 | Long | 307/252 M X |
| 3,321,697 | 5/1967 | Etter | 321/45 |
| 3,354,322 | 11/1967 | Eastop | 307/252 M X |
| 3,388,310 | 6/1968 | Etter | 321/5 |
| 3,406,325 | 10/1968 | Rosa | 321/5 |
| 3,460,021 | 8/1969 | Schlabach | 321/5 |
| 3,500,170 | 3/1970 | Charrin et al. | 321/45 |
| 3,531,712 | 9/1970 | Cecchini | 323/4 |
| 3,548,216 | 12/1970 | Burch | 307/252 M |
| 3,588,667 | 6/1971 | Duff et al. | 321/5 |

FOREIGN PATENTS OR APPLICATIONS

| | | | |
|---|---|---|---|
| 281,443 | 9/1965 | Australia | 321/45 C |

*Primary Examiner*—Donald D. Forrer
*Assistant Examiner*—Larry Anagnos
*Attorney*—Roger S. Borovoy and Alan H. MacPherson

[57] ABSTRACT

A circuit for controlling the conduction of a switching device, such as a silicon controlled rectifier, Thyratron tube, mercury-arc tube and the like, which turns on and off the switching device so as to produce a load voltage with a fast rise time, a fast fall time and a wide range of pulse widths at a high repetition rate. To obtain a fast rise time of the load voltage, the switching device is turned on in series with a direct current source with all elements interconnecting therebetween electrically decoupled. To obtain a fast fall time for the load voltage, a direct current voltage is applied in series with the switching device which is of a polarity opposite from the polarity of the direct current source used to furnish power to the load. This reverse voltage is of an appropriate magnitude and time duration for turning off the switching device, and in addition thereto, electrically decouples the load from any direct current source at the same time as the switching device is reversed biased.

Toward this end, a reactive element is disposed in series with the direct current source and the switching device. It has been found that energy is stored in the reactive element during the turning off or the commutation period of the switching device. Such stored or trapped energy in the reactive element inhibits the succeeding application of the appropriate magnitude and time duration of reverse voltage to the switching device for turning off the switching device. Consequently, such stored trapped energy is a detriment to commutating the switching device in succeeding commutation intervals. Thus, one embodiment of the present invention is to dissipate the trapped energy stored in the reactive element before the next commutation period. Another embodiment of the present invention is to inhibit the accumulation of trapped energy in the reactive element. Both embodiments have a small commutation interval, and are therefore capable of high switching rates.

23 Claims, 9 Drawing Figures

INVENTOR.
DONALD F. PARTRIDGE
BY Jack M. Wiseman
ATTORNEY

INVENTOR.
DONALD F. PARTRIDGE

BY Jack M. Wiseman

ATTORNEY

INVENTOR.
DONALD F. PARTRIDGE
BY
ATTORNEY

INVENTOR
DONALD F. PARTRIDGE
BY Jack M. Wiseman
ATTORNEY

CIRCUIT FOR CONTROLLING THE CONDUCTION OF A SWITCHING DEVICE

BACKGROUND OF THE INVENTION

The present invention relates in general to electronic commutation, and more particularly, to a circuit for controlling the conduction of a switching device.

Apparatus for commutating inverters have been disclosed in U.S. Pat. Nos. 3,213,287; 3,219,905; and 3,340,453. An article entitled "Adjustable-Frequency Invertors and Their Applications To Variable Speed Drives" by D. A. Bradley et al. appeared in the Proceedings of the Institute of Electrical Engineers, Vol. III, No. 11, Nov. 1964, pp. 1833-1846. Another article entitled "Practical Considerations In the Design of Commutation Circuits For Choppers and Inverters" by S. B. Dewan and David L. Duff appeared in the IEEE Conference Record of 1969 Fourth Annual Meeting of the IEEE Industry and General Application Groups, pp. 469–475.

Switching circuits for electronic commutation have conventionally employed silicon controlled rectifier as switching devices to convert direct current voltage into a pulsating direct current source or an alternating current source. It is desirable in such circuits to obtain a load voltage with a fast rise time, a fast fall time and a wide range of pulse widths at a high repetition rate. A fast rise time is obtained by applying a direct current source in series with a switching device and causing it to conduct with all interconnecting elements therebetween electrically decoupled. A fast fall time is obtained by applying in series with the switching device a direct current voltage of a polarity opposite to the polarity of the direct current source used to furnish power to the load, thereby reducing the effective voltage applied to the switching device to a magnitude for turning off the switching device. Also, the load is electrically decoupled from any direct current source as soon as the switching device is reversed biased.

Toward this end, a reactive element, such as an inductance coil, is connected in series with the direct current source and the switching device to provide a path over which the voltage from the direct current source is applied to the switching device, and across which the direct current voltage of opposite polarity is applied to reverse the effective voltage on the switching device during the commutation period or the period in which the switching device is turned off.

It has been found that during the commutation period, energy is stored in the reactive element. Such stored or trapped energy in the reactive element inhibits the succeeding application of the appropriate magnitude and time duration of reverse voltage to the switching device for turning off the same. It has also been found that having not enough stored or trapped energy in said reactive element causes the rise time for the load voltage to be relatively slow. To obtain a fast rise for the load voltage, the voltage applied to the switching device from the direct current source should not be opposed, inhibited or reduced by any series element. To this end the reactive element has to be decoupled during the time the switching element is being turned on or is on.

Heretofore, apparatus for electronic commutation had a long rise time and a long commutation interval; and, therefore, were limited in switching repetition rate. Also, such apparatus required expensive, high frequency magnetic components.

SUMMARY OF THE INVENTION

A circuit for controlling the conduction of a switching device in which the commutation period is minimized, thus, reducing trapped commutation energy in a reactive element between a direct current source and the switching device.

A circuit for controlling the conducting of a switching device in which the commutation period is minimized by inhibiting the accumulation of trapped commutation energy in a reactive element between a direct current source and the switching device.

By virtue of the foregoing, a circuit for controlling the conduction of a switching device is attained in which the load voltage produced by controlling the conduction of the switching device has a fast rise time, a fast fall time, a wide range of pulse widths and a high repetition rate. Hence, the circuit provides switching at high frequencies with a switching device, such as a silicon controlled rectifier. Stated otherwise, a switching circuit is provided for electronic commutation that has the dynamics and characteristics of a transistor used in a switching mode and, yet, operates at a high power level that is possible with silicon controlled rectifiers, Thyratron tubes, mercury-arc tubes and the like. A maximum pulse rate at various pulse widths have been achieved in excess of 20 kilo Hertz, when silicon controlled rectifiers are used.

The circuit of the present invention has reduced the requirements for expensive, high frequency magnetic components. The number of switching devices required have been reduced to perform the functions and operations heretofore accomplished when multi-switch arrangements are used. Presently, auxiliary voltage sources or switching device requirements have been reduced without undesired interaction between the switching devices.

It has been found that the reactive element, such as an inductance coil or other magnetic device, should conduct a suitable free wheeling current in the magnetic component when the switching device conducts or is turned on to achieve the fast rise time of the load voltage. It has also been found that if this free wheeling current is allowed to rise to a high value, it inhibits the commutating of the switching device on succeeding commutating intervals. If the free wheeling current is kept at a relatively constant value, the current is such as not to be too high or too low. When this is achieved and the commutation period is short, the switching device operates to turn off at a high switching frequency without the need of parallel switching devices.

The present invention provides a switching circuit with a load voltage having a fast rise time, a fast fall time at a high pulse frequency (with a wide range of pulse widths) by minimizing trapped commutation energy and maintaining the magnitude of the trapped commutation energy relatively constant during the variations in load. Also, the present invention provides a switching circuit with a load voltage having a fast rise time and a fast fall time, at a high pulse frequency by maintaining the trapped commutation energy at a level or magnitude where it is only sufficient to compensate for losses in the free wheeling device and the magnetic reactive component in series with the direct current source and the switching device. Stated otherwise, reducing the unnecessary trapped energy to zero.

DETAILED DESCRIPTION OF PREFERRED EMBODIMENTS

Figure 1:
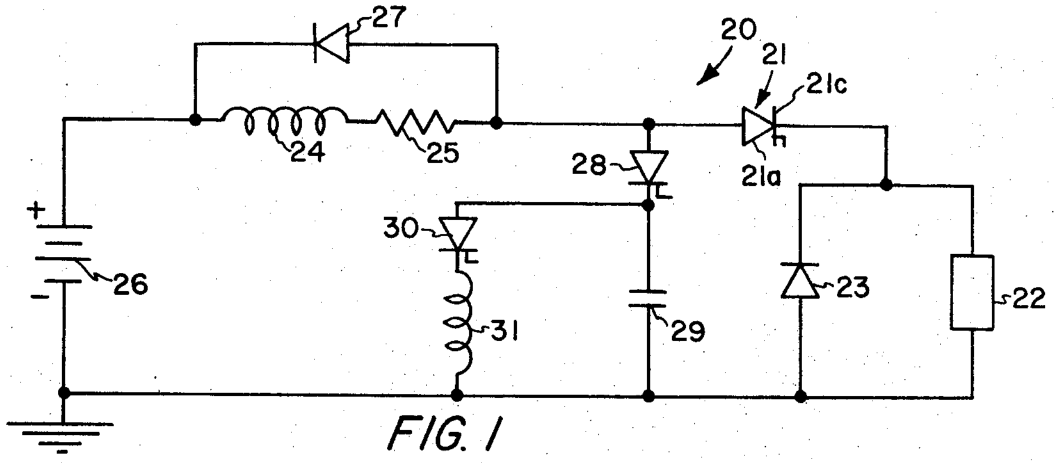
FIG. 1 is a schematic diagram of a circuit for electronic commutation embodying the present invention wherein trapped commutation energy stored in a reactive element in series with the switching device is minimized.

Illustrated in FIG. 1 is a switching circuit 20 for turning on and turning off a switching device to control the conduction thereof to thereby produce a pulsating voltage for a load. The switching circuit 20 comprises a switching device 21, which may be a silicon controlled rectifier, a Thyratron tube, a mercury-arc tube and the like. In the exemplary embodiment, the switching device 21 is a silicon controlled rectifier with an anode **21*a* and a cathode 21*c*. Connected to the cathode 21*c* of the silicon controlled rectifier 21 is a load 22. The other side of the load 22 is connected to ground. A clamping diode 23 is connected in parallel with the load 22**.

Connected to the anode **21*a* of the silicon controlled rectifier 21 is a series circuit which includes a reactive element 24, such as an inductance coil, and a resistor 25. The other side of the inductance coil 24 is connected to the positive side of a suitable source 26 of direct current voltage. The negative side of the source 26 of direct current voltage is connected to ground. A clamping diode 27 is connected in parallel with the inductance coil 24 and the resistor 25**.

Also connected to the anode **21*a* is a circuit which includes a silicon controlled rectifier 28 and a serially connected capacitor 29. Connected in parallel with the capacitor 29 is a silicon controlled rectifier 30 and a serially connected inductance coil 31. The other side of the capacitor 29** is connected to ground.

A fast rise time of the load voltage is achieved by causing the silicon controlled rectifier 21 to conduct under conditions where the load current does not exceed the current free wheeling in the inductance coil 24, resistor 25 and diode 27. When the switching device 21 is turned on, current flows over the following path: ground, source 26 of direct current voltage, inductance coil 24, resistor 25, switching device 21, load 22 and back to ground.

While the switching device 21 conducts, the silicon controlled rectifier 28 is off. The silicon controlled rectifier 28 isolates the capacitor 29 from the switching device 21 during the period the switching device 21 is conducting.

A fast fall time for the load voltage is attained by driving the anode **21*a* of the switching device 21 negatively with respect to ground and by providing an immediate bypass or low impedance path for the current flow from the source 26 of direct current voltage to isolate the source of direct current voltage 26 from the switching device 21 and, therefore, from the load 22. Toward this end, a switching device turn off circuit with includes the silicon controlled rectifier 28 and the capacitor 29 is connected to the anode 21*a* of the switching device 21 and also is connected to the series circuit including the inductance coil 24 and the resistor 25. It is the inductance coil 24 and the resistor 25 that serially interconnects the source 26 of direct current voltage to the anode 21*a* of the switching device 21**.

When the silicon controlled rectifier 28 conducts, the capacitor 29, which was previously charged to a predetermined negative potential, turns off the switching device 21. The commutation period occurs while the switching device 21 is turned off. When the silicon controlled rectifier 28 conducts, the negative potential on the capacitor 29 is applied to the anode **21*a* of the switching device 21, which induces a voltage opposite in polarity to the source 26 of direct current voltage across a magnetic device, such as the inductance coil 24. This action reduces the effective positive potential applied to the anode 21*a* of the switching device 21 to turn off the switching device 21. Such a magnetic device, however, should not inhibit the application of the positive potential of the direct current source 26 to the anode 21*a* of the switching device 21 when the switching device 21 is to be turned on and thereby impede the fast rise time for the load voltage. Rise time being defined as the time from when the silicon controlled rectifier 21** starts conducting to when the load voltage is at 90 percent of its final value.

Simultaneously with the application of the negative potential of the capacitor 29 on the anode **21*a* of the switching device 21, the silicon controlled rectifier 28 and the capacitor 29 provide a bypass or a low impedance path for the source 26 of direct current voltage to divert or isolate the source 26 of direct current voltage from the switching device 21 and thereby from the load 22. This is accomplished over the following path: ground, direct current source 26, inductance coil 24, resistor 25, silicon controlled rectifier 28, capacitor 29** and back to ground.

When a negative potential is applied to the anode **21*a* of the switching device 21 from the capacitor 29, the potential on the cathode 21*c* of the switching device 21 goes negative as the load 22 tries to maintain the current therethrough constant. This occurs when an inductive load is employed, which is not required for operation. However, the clamping diode 23 will maintain the negative potential on the cathode 21*c* of the switching device 21 constant. The load current will then flow through the load 22 over a closed path by way of the diode 23**.

While the silicon controlled rectifier 28 conducts, the capacitor 29 charges positively until the potential thereon is approximately equal to the potential of the direct current source 26. The current flow through the inductance coil 24 tries to charge the capacitor 29 to a more positive potential but the positive potential on the capacitor 29 is maintained at the approximate potential of the direct current source 26 by the clamping diode 27. The current flowing through the inductance coil 24 and the resistor 25 now flows through the diode 27. When the current flow through the diode 27 equals in magnitude the current flow through the inductance coil 24 and the resistor 25, the current flow through the silicon controlled rectifier 28 is reduced to zero and the silicon controlled rectifier 28 is turned off.

The silicon controlled rectifier 30 and the inductance coil 31 constitute a recycle circuit for controlling the recycling time of the voltage on the capacitor 29. It is the capacitor 29 that has the potential thereon reversed from negative to positive to turn off the silicon controlled rectifier 21 as above described. When the silicon controlled rectifier 28 is turned off, the circuit 20 begins a new cycle and the switching device 21 can once again conduct in the manner above described and the capacitor 29 will once again be charged negatively by recycling the voltage on the capacitor 29. More specifically, after the commutation period and after the silicon controlled rectifier 28 has started to regain its forward blocking characteristics, the silicon controlled rectifier 30 conducts so that the charge on the capacitor 29 is reversed to prepare the circuit 20 for another commutation cycle. The inductance coil 31 regulates the recycling time by setting the natural frequency of the timing network comprising the inductance coil 31 and the capacitor 29.

During the period of time the switching device 21 is turned off (or during the commutation period), energy from the direct current source 26 is stored in the serially connected reactive element 24. According to one embodiment of the present invention, the trapped commutation energy stored in the reactive element 24 is dissipated or reduced by the resistor 25, the diode 27 and the resistance of the inductance coil 24. The resistor 25 in series with the reactive element 24 serves to dissipate the same amount of trapped energy stored in the reactive element 24 during the commutation period so that under the changing load or load voltage requirements, the current flow through the inductance coil 24 is greater than the load current under all load conditions. Thus, there is a minimum of trapped commutation energy per cycle in the reactive element 24.

The current flow through the inductance coil 24 and the resistor 25 is never less than the maximum load current. Therefore, when the switching device 21 is turned on, the current flow through the inductance coil 24 and the resistor 25 will divide between the load on one hand and the diode 27 on the other hand. Hence, there is a rapid rise time for the load voltage since the inductance coil 24 and resistor 25 are always electrically decoupled from the series circuit of the direct current source 26 and the switching device 21.

The magnitude of the resistor 25 is selected so that the current flow through the inductance coil 24 is always greater than the current flow through the load 22. Also, the magnitude of the resistor 25 is selected so that the energy dissipated by the current through the resistor 25, the inductance coil 24 and the diode 27 is approximately equal to the trapped commutation energy stored in the reactive element 24 each commutation cycle.

Figure 2:
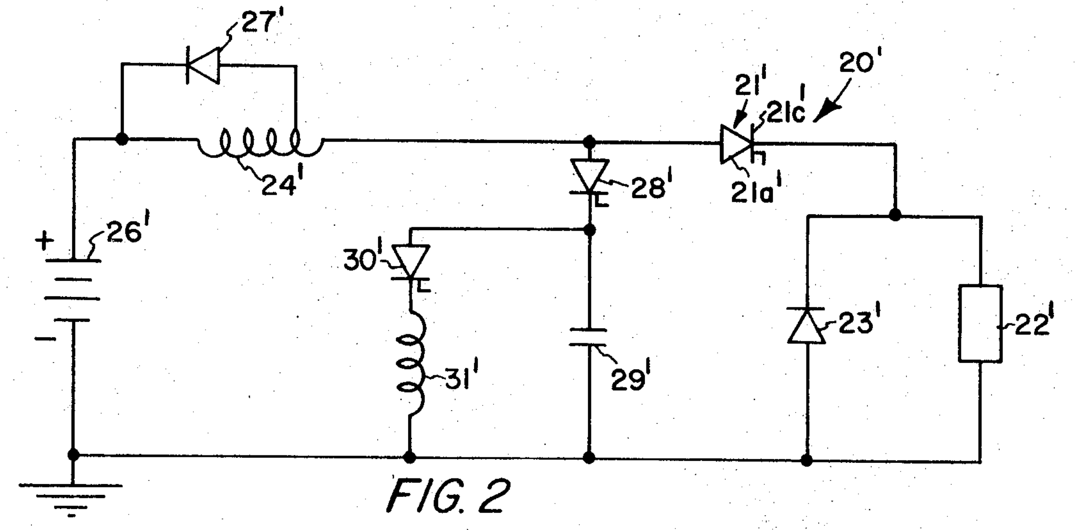
FIG. 2 is a schematic diagram of a circuit for electronic commutation, which is a modification of the circuit shown in FIG. 1 and particularly illustrates the use of a tapped coil in conjunction with a free wheeling diode to dissipate trapped commutation energy stored in the coil in lieu of the employment of the resistor in FIG. 1.

In FIG. 2 is illustrated a circuit 20' for controlling the conduction of a switching element 21'. The circuit 20' operates in a manner similar to the operation of the circuit 20. Hence, like parts are shown with the same reference numeral, but with a prime suffix. The circuit 20' omits the use of the resistor 25 and in lieu thereof, a tap on the inductance coil 24' is selected so that the free wheeling current in the diode 27' is of a sufficient magnitude to dissipate through the inductance coil 24' and the diode 27' the amount of energy that was dissipated by the inductance coil 24, diode 27 and the resistor 25 of the circuit 20 in FIG. 1.

Figure 3:
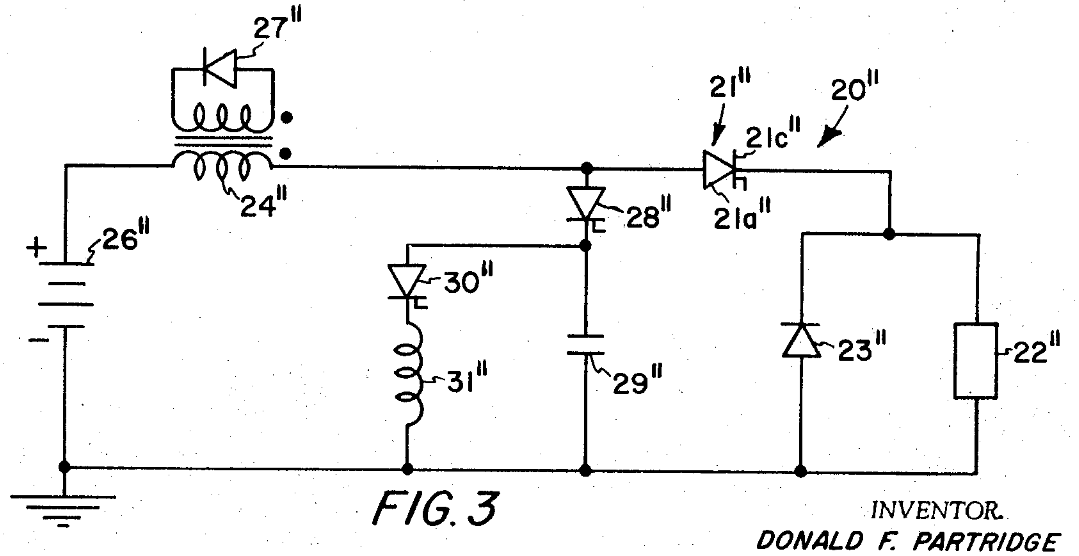
FIG. 3 is a schematic diagram of a circuit for electronic commutation which is a further modification of the circuit shown in FIG. 1 and particularly illustrates an arrangement for adjusting the turns ratio of transformer to dissipate trapped commutation energy stored in the reactive element in series with the switching device in lieu of the employment of the resistor in FIG. 1.

A circuit 20'' in FIG. 3 for controlling the conduction of a switching element 21'' operates in a manner similar to the described operation of the circuit 20 of FIG. 1. Therefore, like parts are shown with the same reference numeral but with a double prime suffix. The circuit 20'' omits the use of the resistor 25 and in lieu thereof, employs a magnetic device, such as a transformer 24'' with the turns ratio thereof preselected. The turns ratio of the transformer 24'' is selected so that the free wheeling current in the diode 27'' is of a sufficient magnitude to dissipate through the transformer 24'' and the diode 27'', the amount of energy that was dissipated by the inductance coil 24, diode 27 and resistor 25 of the circuit 20 in FIG. 1.

Figure 8:
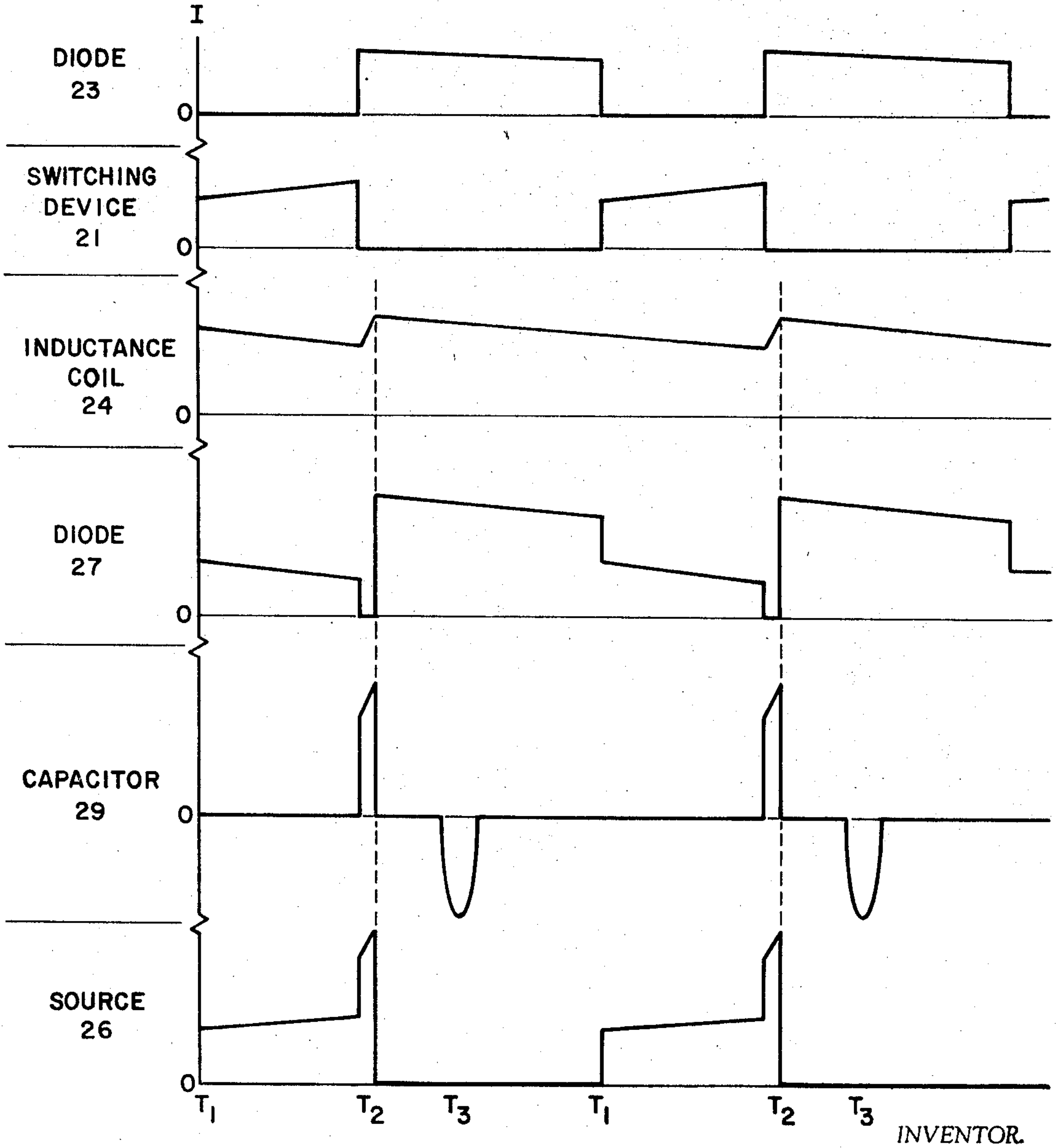
FIG. 8 is a graphic illustration of operating current characteristics for the circuit shown in FIG. 1 when employing an inductive load.
Figure 9:
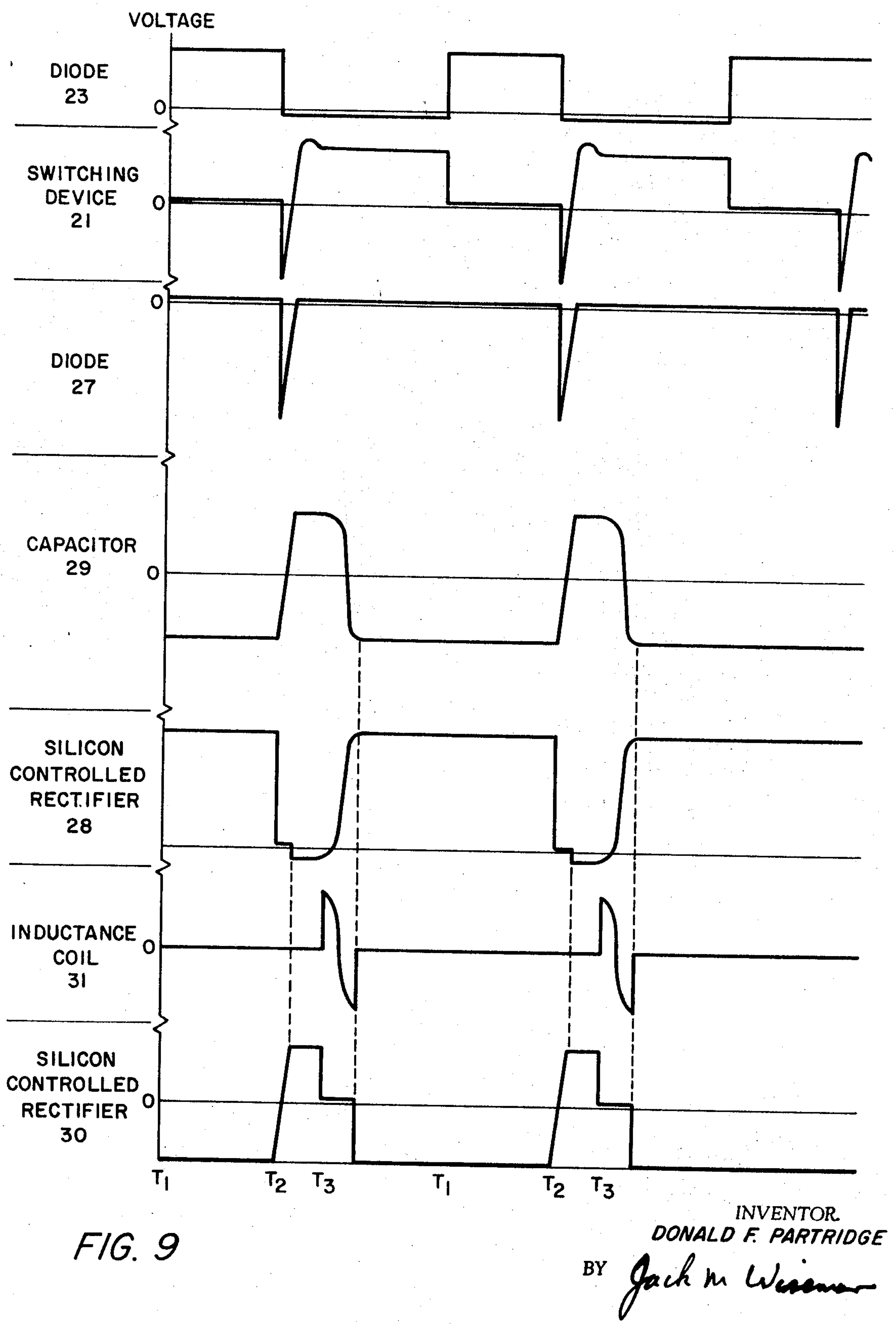
FIG. 9 is a graphic illustration of operating voltage characteristics for the circuit shown in FIG. 1 when employing an inductive load.

FIG. 8 illustrates graphically the current operating characteristics for the various elements employed in the circuit 20 when the load 22 is inductive. Along the Y—Y axis is the current flow I in milliamperes and along the X—X axis is time. At the time $T_1$, the switching device 21 is turned on; at the time $T_2$, the switching device 21 is turned off; and at the time $T_3$, the silicon controlled rectifier 30 is turned on to reverse the polarity of the potential on the capacitor 29. FIG. 9 illustrates graphically the voltage operating characteristics for the various elements employed in the circuit 20 when the load 22 is inductive. Along the Y—Y axis is the voltage in volts and along the X—X axis is time. At the time $T_1$, the switching device 21 is turned on; at the time $T_2$, the switching device 21 is turned off; and at the time $T_3$, the silicon controlled rectifier 30 is turned on to reverse the polarity of the potential on the capacitor 29.

Figure 4:
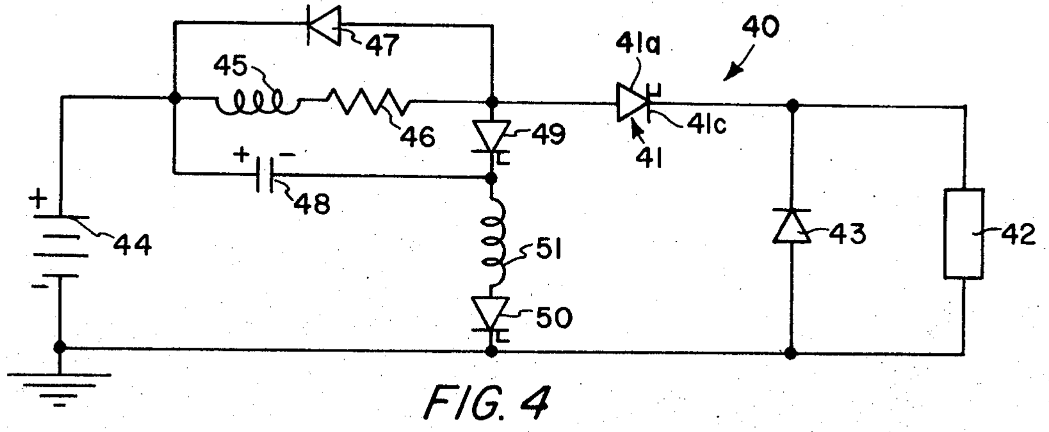
FIG. 4 is a schematic diagram of a circuit for electronic commutation embodying the present invention wherein the accumulated trapped commutation energy in the reactive element in series with the switching device during the commutation period is dissipated and, in addition thereto, the drawing of current from the direct current source is avoided during the commutation period.

Illustrated in FIG. 4 is a circuit 40 for controlling the conduction of a switching device 41. During the commutation period or the period in which the switching device 40 is turned off, no current is drawn from the source of direct current voltage.

More particularly, the circuit 40 comprises the switching device 41, which may be a silicon controlled rectifier, a Thyraton tube, a mercury-arc tube or the like. In the exemplary embodiment, the switching device 41 is a silicon controlled rectifier with an anode **41*a* and a cathode 41*c*. Connected to the cathode 41*c* of the switching device 41 is a load 42. The other side of the load 42 is connected to ground. A clamping diode 43 is connected in parallel with the load 42**.

A source 44 of direct current voltage is connected at its positive terminal to the anode **41*a* of the switching device 41 through a series circuit which includes a reactive element 45 and a resistor 46. The negative side of the source 44 of direct current voltage is connected to ground. The reactive element 45 is preferably a magnetic device and in the exemplary embodiment is an inductance coil. A clamping diode 47 is connected in parallel with the series circuit including the inductance coil 45 and the resistor 46**.

For applying a negative voltage to the anode 41a of the switching device 41, a series circuit including a capacitor 48 and a silicon controlled rectifier 49 is connected at one end to the junction between the resistor 46 and the anode **41*a* of the switching device 41 and is connected at the other end to the junction between the inductance coil 45 and the positive side of the source 44 of direct current voltage. The inductance coil 45, the resistor 46, the silicon controlled rectifier 49 and the capacitor 48** form a closed loop.

Connected to the junction between the capacitor 48 and the silicon controlled rectifier 49 is a series circuit including an inductance coil 51 and silicon controlled rectifier 50. The cathode of the silicon controlled rectifier 50 is connected to ground.

The circuit 40 of FIG. 4 operates in the sequence and in the manner described for the operation of the circuit 20 in FIG. 1 with the difference that in the circuit 40 there is no current drawn from the source 44 of direct current voltage during the commutation period or the period in which the switching device 41 is turned off. During the commutation period, the silicon controlled rectifier 49 conducts and the capacitor 48 discharges to approximately 0 volts. Most of the energy in the capacitor 48 is transferred over the closed loop to the inductance coil 45. The voltage induced in the inductance coil 45 is of opposite polarity to the voltage of the source 44 of direct current voltage and of a sufficient magnitude to reverse bias the silicon controlled rectifier 41; thus, to electrically decouple the load from any direct current source as previously explained. When the capacitor 48 discharges to 0 volts, inductance coil 45 will try to reverse the voltage on the capacitor 48 but will be clamped by diode 47. When the current in diode 47 is equal to the current in inductance coil 45, the current in the silicon controlled rectifier 49 has been reduced to 0 and it will turn off. After the silicon controlled rectifier 49 has turned off, the silicon controlled rectifier 50 is turned on for the recharging of the capacitor 48. The capacitor 48 will be charged to a positive potential of approximately twice the voltage of the direct current source 44. The energy drawn from the direct current source 44, when the capacitor 48 is charging positively, is approximately equal to the trapped energy stored in the reactive element 24 of FIG. 1 during the commutation period. The excess energy stored in inductance coil 45 is dissipated by the resistor 46, the resistance of the inductance coil 45 and the diode 47 in the same manner as described previously for the circuit 20 in FIG. 1.

Figure 5:
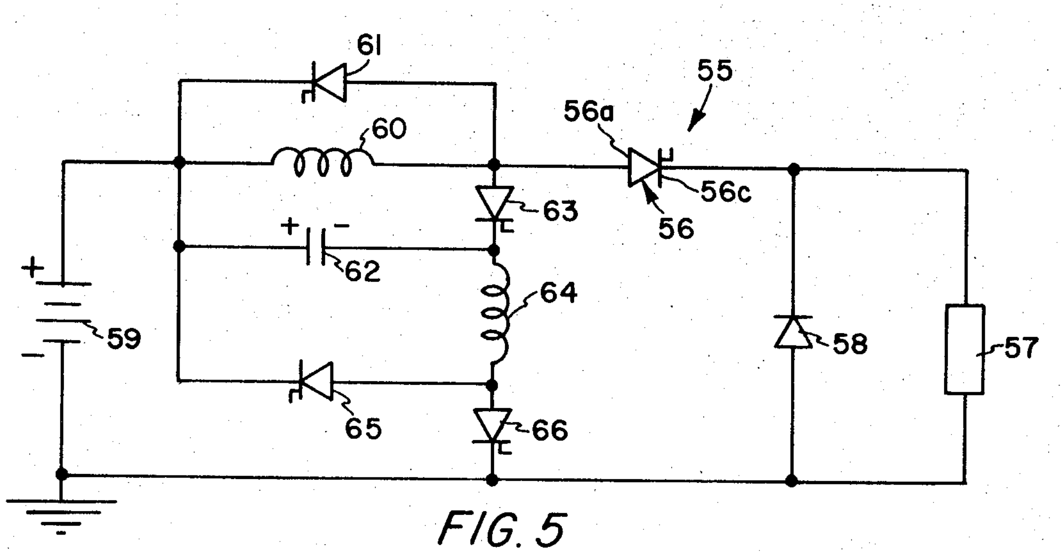
FIG. 5 is a schematic diagram of a circuit for electronic commutation embodying the present invention which is a modification of the circuit shown in FIG. 4, and particularly illustrating a closed loop to reclaim excess trapped commutation energy stored in the reactive element.

In FIG. 5 is illustrated a circuit 55 for controlling the conduction of a switching device 56 that employs a closed loop to reclaim energy stored in a reactive inductive element interconnecting the source of direct current voltage with the switching device that would be dissipated according to one embodiment of the present invention for reducing trapped commutation energy stored in the reactive element during the commutation period. In this manner, the consumed energy is reduced to a minimum and the energy can be reused for the commutation of the switching device. The only energy required to be restored is the energy dissipated by the power losses in the reactive inductive element caused by the resistance thereof and the power loss in the free wheeling clamping element in parallel with the reactive inductive element.

The circuit 55 comprises the switching device 56, which may be a silicon controlled rectifier, a Thyratron tube, a mercury-arc tube or the like. In the exemplary embodiment, the switching device 56 is a silicon controlled rectifier with an anode 56*a* and a cathode 56*c*. The cathode 56*c* of the switching device 56 is connected to a load 57. The other side of the load 57 is connected to ground. A clamping diode 58 is connected in parallel with the load 57.

A source 59 of direct current voltage is connected to the anode 56*a* of the switching device 56 through a series circuit which includes an inductive reactive element 60. The negative terminal of the direct current source 59 is connected to ground. In the exemplary embodiment, the reactive inductive element 60 is an inductance coil. A free wheeling silicon controlled rectifier 61 is connected in parallel with the inductance coil 60.

For turning off the switching device 56, a series circuit of a capacitor 62 and a silicon controlled rectifier 63 is connected to the junction between the anode 56*a* of the switching device 56 and the inductance coil 60. The other side of the series circuit is connected to the junction between the inductance coil 60 and the positive side of the source 59 of direct current voltage. Thus, a closed loop is formed comprising the inductance coil 60, the silicon controlled rectifier 63 and the capacitor 62. A recycle circuit comprising an inductance coil 64 and a silicon controlled rectifier 65 is connected in parallel with the capacitor 62 and thereby connected one side to the junction between the silicon controlled rectifier 63 and the capacitor 62. A silicon controlled rectifier 66 connects the junction between the inductance coil 64 and the silicon controlled rectifier 65 to ground.

In the operation of the circuit 55, the switching device 56 is turned on to provide a fast rise time for the load voltage by the application of positive potential from the source 59 of direct current voltage to the anode 56*a* of the switching device 56 through the inductance coil 60. When the switching device 56 is turned on, current flows from ground, through the source 59 of direct current voltage, the inductance coil 60, the switching device 56, the load 57 and back to ground. After the switching device 56 is turned off, the capacitor 62 charges to a potential of the polarity shown in FIG. 5. The silicon controlled rectifier 63 is not conducting while the switching device 56 is turned on and, hence, isolates the capacitor 62 from the anode 56*a* of the switching device 56.

After the capacitor 62 is charged to a preselected potential, the silicon controlled rectifier 63 conducts to connect the negatively charged side of the capacitor 62 to the anode 56*a* of the switching device 56 and the positively charged side of the capacitor 62 to the opposite end of the inductance coil 60. As a consequence thereof, a potential is induced in the inductance coil 60 in series with the source 59 of direct current voltage and the anode 56*a* of the switching device 56 but of an opposite polarity with respect to the source 59 of direct current voltage.

In effect, the capacitor 62 is connected across the inductance coil 60. Hence, the potential difference across the switching device 56 is the difference between the voltage of the source 59 of direct current voltage and the voltage across the inductance coil 60 in the same manner as the circuit shown in FIG. 4. The anode 56*a* is at a negative potential with respect to the cathode 56*c*. The potential on the cathode 56*c* will be clamped or be maintained constant by the clamping diode 58, which forms a closed loop with the load 57. Through the above described action, the switching device 56 is turned off.

While the switching device 56 is turned off, current flows over a closed loop over the following path: inductance coil 60, silicon controlled rectifier 63, capacitor 62 and back to the inductance coil 60. During the time, current flows over the closed loop just described, the charge on the capacitor 62 discharges and the potential thereof is reduced toward 0 volts. When the potential across the capacitor 62 reaches 0 volts, the energy stored in the capacitor 62 has been transferred to the inductance coil 60.

After the capacitor 60 is fully discharged in the manner just described, the voltage of the inductance coil 60 reverses polarity and the capacitor 62 begins to charge with a potential thereacross of an opposite polarity. The capacitor 62 continues to so charge until it receives all of the energy stored in the inductance coil 60 less the energy expended by the free wheeling of the silicon controlled rectifier 61 and the energy expended by the resistance of the inductance coil 60.

When the correct amount of energy has been returned to the capacitor 62, the silicon controlled rectifier 61 conducts to clamp or to maintain constant the potential of the charge stored in the capacitor 62. This action leaves the flow of current through the inductance coil 60 higher than it was at the beginning of the commutation period. The increase of energy will be dissipated by the resistance of the inductance coil 60 and the free wheeling silicon controlled rectifier 61.

After the potential on the capacitor 62 is clamped and is maintained constant, the potential thereon is of a sufficient magnitude to turn off the silicon controlled rectifier 63. Thereupon, the silicon controlled rectifier 65 conducts to reverse the polarity of the potential on the capacitor 62.

The turning on of the silicon controlled rectifier 65 causes the potential across the capacitor 62 to be reversed to a magnitude less than the magnitude of the potential across the capacitor 62 at the beginning of the commutation period. The energy remaining in the inductance coil 60 at the end of the commutation period is sufficient to keep the current flow through the inductance coil 60 of a magnitude above the magnitude of the load current until the beginning of the succeeding commutation period. Since the energy stored in the capacitor 62 has been reduced by the amount of energy stored in the inductance coil 60, the potential across the capacitor 62 has to be increased to a magnitude equal to the magnitude of the potential across the capacitor 62 prior to the beginning of the commutation period. This is accomplished by the turning on of the silicon controlled rectifier 66. Thus, a circuit with no excess trapped commutation energy stored in the reactive element interconnecting the direct current source with the anode of the switching device.

Stated otherwise, the circuit 55 does not return trapped commutation energy to the direct current source but rather draws an amount of energy from the direct current source sufficient to replace the energy losses consumed in the circuit 55. Hence, there is electronic commutation without any surplus trapped commutation energy in the reactive element. It is apparent that similar results can be achieved by employing a serially connected diode and inductance coil in lieu of the silicon controlled rectifier 61.

Figure 6:
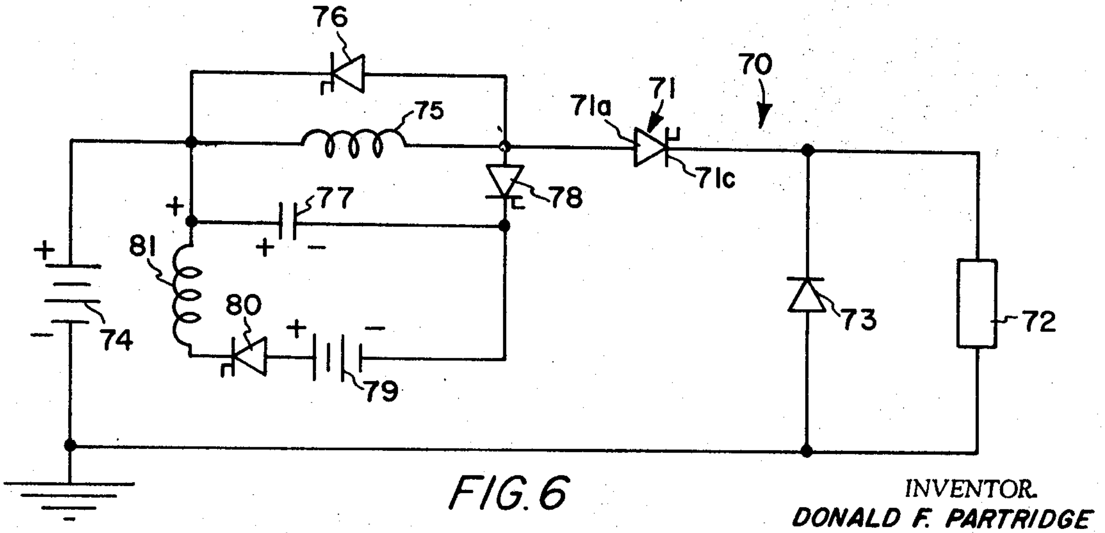
FIG. 6 is a schematic diagram of a circuit for electronic commutation embodying the present invention which is a further modification of the circuit shown in FIG. 4 and particularly illustrating a closed loop to inhibit the accumulation of trapped energy in the reactive element during the commutation period.

Illustrated in FIG. 6 is a circuit 70 for controlling the conduction of a switching device 71. The circuit 70 embodies a closed loop circuit to inhibit the accumulation of trapped commutation during commutation in the reactive element in series with the switching device, while maintaining the commutation interval at a minimum, thereby enabling high frequency pulses to be produced for the load voltage. Thus, the circuit 70 has no trapped commutation energy and is less restrictive as to load and is capable of producing high frequency pulses within a large range of pulse widths.

The circuit 70 includes the switching device 71, which may be a silicon controlled rectifier, a Thyratron tube, a mercury-arc tube and the like. In the exemplary embodiment, the switching device 71 is a silicon controlled rectifier with an anode 71*a* and a cathode 71*c*. Connected to the cathode 71*c* of the switching device 71 is a load 72. The other side of the load 72 is connected to ground. A clamping diode 73 is connected in parallel with the load 72.

A source 74 of direct current voltage is connected to the anode 71*a* of the switching device 71 through a serially connected magnetic device, such as an inductance coil 75. A silicon controlled rectifier 76 is connected in parallel with the inductance coil 75. The negative side of the direct current source 74 is connected to ground.

For turning off the switching device 71, a series circuit including a capacitor 77 and a silicon controlled rectifier 78 is connected at one side to the junction between the anode 71*a* of the switching device 71 and the inductance coil 75 and at the other side the junction between the inductance coil 75 and the direct current source 74. A series circuit including a source 79 of direct current voltage, a silicon controlled rectifier 80 and inductance coil 81 is connected in parallel with the capacitor 77 to provide a recycling or recharging circuit to control the charging of the capacitor 77 for recycling the circuit 70. The inductance coil 75, the silicon controlled rectifier 78 and the capacitor 77 form a closed loop for inhibiting the accumulation of trapped commutation energy in the reactive element 75 during the commutation period.

In the operation of the circuit 70, a positive potential is applied to the anode 71*a* of the switching device 71 through the inductance coil 75. When the switching device 71 conducts, current flows over the following path: ground, direct current source 74, inductance coil 75, switching device 71, load 72 and back to ground. After the switching device 78 is nonconducting the capacitor 77 is charged to a potential of the polarity shown in FIG. 6. The silicon controlled rectifier 78 isolates the capacitor 77 from the anode 71*a* of the switching device 71 when the switching device 71 is conducting, since the silicon controlled rectifier 78 is off.

When the silicon controlled rectifier 71 is to be commutated, the silicon controlled rectifier 78 is caused to conduct. As a consequence thereof, the negative side of the capacitor 77 is applied to the anode 71*a* of the switching device 71 through the conducting silicon controlled rectifier 78. Thus, a negative potential is applied to the anode 71*a* of the switching device 71. In effect, the capacitor 77 is connected across the inductance coil 75.

The potential difference across the inductance coil 75 and the capacitor 77 is larger in magnitude and of opposite polarity with respect to the voltage of the direct current source 74. The potential on the cathode 71*c* of the switching device 71 will go negative as the load 72 tries to maintain the current therethrough. This assumes that the load 72 is an inductive load. The clamping diode 73 in forming a closed loop with the load 72 will clamp or maintain the negative potential on the cathode 71*c* constant. Through this action, the switching device 71 is turned off. While the switching device 71 is turned off, current flows through a closed loop over a path including the inductance coil 75, the silicon controlled rectifier 78, the capacitor 77 and back to the inductance coil 75.

While current flows through the inductance coil 75, the silicon controlled rectifier 78, and the capacitor 77 over the closed loop, the charge stored in the capacitor 77 is transferred to the inductance coil 75 and the potential on the capacitor 77 decays toward zero. When the potential across the capacitor 77 reaches zero, the energy stored in the capacitor 77 is transferred to the inductance coil 75.

After the capacitor 77 is fully discharged in the manner above described, the voltage of the inductance coil 75 reverses polarity and the capacitor 77 begins to charge with a potential thereacross of an opposite polarity. The capacitor 77 continues to charge until it receives all the energy stored in the inductance coil 75 less the energy expended by the free wheeling silicon controlled rectifier 76 and the energy expended by the resistance of the inductance coil 75. Such energy is expended until the commencement of the succeeding cycle of commutation for the circuit 70.

Prior to the commencement of the succeeding cycle, the silicon controlled rectifier 76 conducts in its free wheeling action to clamp or maintain constant the potential of the charge stored in the capacitor 77, thus leaving the flow of current through the inductance coil 75 higher than it was at the beginning of the commutation period.

After the potential on the capacitor 77 is clamped and maintained constant, the potential thereon is of sufficient magnitude to turn off the silicon controlled rectifier 78. After the silicon controlled rectifier 78 is off, the silicon controlled rectifier 80 conducts. The polarity of the potential across the capacitor 77 is reversed to prepare for the initiation of the succeeding cycle.

When the silicon controlled rectifier 78 is off and the silicon controlled rectifier 80 is conducting, current flows over the following path: direct current source 79, silicon controlled rectifier 80, inductance coil 81, capacitor 77 and back to the direct current source 79. It is this action that reverses the polarity of the potential across the capacitor 77 and adds energy to the closed loop circuit to replace the energy that will be consumed by the resistance of the inductance coil 75 and the free wheeling silicon controlled rectifier 76. Thus, the direct current source 79 in series with the capacitor 77 replenishes the energy left in the inductance coil 75 by adding energy to the capacitor 77 to compensate for the energy that was left in the inductance coil 75, which will be dissipated by the resistance of the inductance coil 75 and the free wheeling silicon controlled rectifier 76 until the next commutation cycle.

Figure 7:
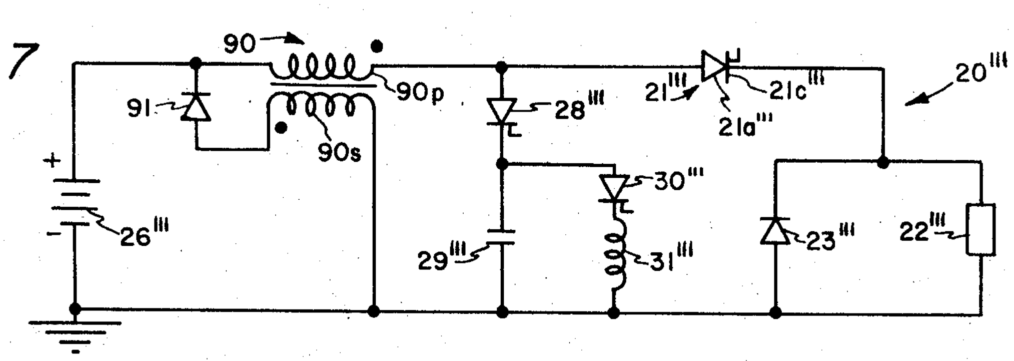
FIG. 7 is a schematic diagram of a circuit for electronic commutation embodying the present invention which is a still further modification of the circuit shown in FIG. 4 in that a transformer is employed to feed trapped commutation energy stored in the primary of the transformer back to the direct current source continuously, except during the commutation period, for obviating excess trapped energy in the primary of the transformer.

Illustrated in FIG. 7 is a circuit 20''' for controlling the conduction of a switching element 21'''. The circuit 20''' operates in a manner similar to the operation of the circuit 20. Hence, like parts are shown with the same reference numeral, but with a triple prime suffix. The circuit 20''' omits the use of the inductance coil 24 and resistor 25, and in lieu thereof uses a transformer 90. The primary 90*p* of the transformer 90 is in series with the source 26''' of direct current voltage and the anode 21*a*''' of the switching device 21'''. The secondary 90*s* of the transformer 90 is in series with a diode 91, and both the secondary windings 90*s* and the diode 91 are connected across the source 26''' of direct current voltage. Unlike circuit 20 and in keeping with operations described in FIGS. 4–6, however, the transformer 90 returns the trapped commutation energy that is stored in the primary windings 90*p* back to the source 26''' of direct current voltage continuously until the next commutation period. In this manner, there is no excess trapped commutation energy.

After the commutation period begins by the turning off of the switching device 21''', the capacitor 29''' charges positively until it reaches a magnitude of approximately the magnitude of the source 26''' of direct current voltage plus the magnitude of the source 26''' of direct current voltage divided by the turns ratio of the transformer 90. At this time, the current flowing in the primary windings 90*p* is diverted to the secondary windings 90*s* because of the clamping action of the diode 91. Since there is no longer any current flowing through the silicon controlled rectifier 28''', it is turned off.

When the current is transferred to the secondary windings 90*s*, it flows in such a direction as to return all the excess trapped commutation energy of the primary windings 90*p* to the source 26''' of direct current voltage via the secondary windings 90*s*.

Should the turns ratio of the transformer 90 be such that the energy fed back to the source 26''' of direct current voltage during the time the silicon controlled rectifier 28''' is nonconducting is equal to the trapped commutation energy less the losses from the diode 91 and transformer 90, then the primary windings 90*p* of the transformer 90 will not inhibit the application of positive potential from the source 26''' of direct current voltage when the switching device 21''' is to be turned on. This is made possible by the presence of free wheeling flux of a sufficient magnitude to maintain the current flow in the primary windings 90*p* equal to the current flow through the load 22''' at any time. The turns ratio of the transformer 90 is such that the free wheeling flux produced by the current flow in the secondary windings 90*s* is greater than what will be required by the load current. Stated otherwise, the transformer 90 is effectively electrically decoupled from the series circuit of direct current source 26''' and silicon controlled rectifier 21'''. Hence, the energy fed back to the source 26''' of direct current voltage under light loads from the secondary windings 90*s* between commutation periods after compensating for losses from the diode 91 and transformer 90 is equal to the trapped commutation energy stored in the primary windings 90*p* during the commutation period. Under normal load conditions, approximately the same amount of energy is reclaimed, but portions thereof will be fed to the load 22''' by way of the primary windings 90*p*.

I claim:

1. A circuit for electronic commutation comprising:

a. a switching device;

b. a load connected to said switching device;

c. a source of direct current voltage;

d. a first circuit interconnecting in series said switching device with said source of direct current voltage for applying the potential of said direct current voltage to said switching device, energy control means in said first circuit for maintaining the current flow through said first circuit greater than the current flow through said load, said first circuit being effectively substantially electrically decoupled from the series circuit of said source of direct current voltage and said switching device when said switching device is being turned on or is on;

e. a second circuit connected to said first circuit and said switching device with means to supply electrical energy to said first circuit for the application in said first circuit of a voltage opposite in polarity to the potential of said source of direct current voltage to turn off said switching device.

2. A circuit as claimed in claim 1 wherein said first circuit comprises a magnetic device.

3. A circuit as claimed in claim 1 wherein said first circuit comprises a reactive element.

4. A circuit as claimed in claim 2 wherein said energy control means maintains a free wheeling current in said magnetic device of sufficient magnitude so that when said switching device is turned on the potential from said source of direct current is applied to said switching device without any impediment.

5. A circuit as claimed in claim 3 wherein trapped commutation energy stored in said reactive element during the period when said switching device is commutated is reduced by said energy control means.

6. A circuit as claimed in claim 5 wherein said energy control means is a resistor connected in series with said reactive element for dissipating trapped commutation energy stored in said reactive element.

7. A circuit as claimed in claim 5 wherein said first circuit and said energy control means consists of a tapped inductance coil.

8. A circuit as claimed in claim 5 wherein said first circuit and said energy control means consists of a transformer with a preselected turns ratio.

9. A circuit as claimed in claim 3 wherein trapped commutation energy stored in said reactive element is minimized by said energy control means.

10. A circuit as claimed in claim 1 wherein said first and second circuits are connected to form a closed loop.

11. A circuit as claimed in claim 10 wherein the voltage induced in said first circuit is of sufficient magnitude to reverse bias said switching device until said switching device is off.

12. A circuit as claimed in claim 10 wherein the accumulation of trapped energy in said first circuit is inhibited during the period said switching device is commutated.

13. A circuit as claimed in claim 10 wherein trapped energy stored in said first circuit during the period said switching device is being commutated is reclaimed for the turning off of said switching device during a succeeding cycle.

14. A circuit as claimed in claim 10 wherein energy drain from said source of direct current voltage for commutation of said switching device is of a sufficient quantity to replace energy losses consumed by said first circuit.

15. A circuit for electronic commutation comprising:

a. a switching device;

b. a load connected to said switching device;

c. a source of direct current voltage;

d. a first circuit interconnecting in series said switching device with said source of direct current voltage for applying the potential of said direct current voltage to said switching device energy control means in said first circuit for maintaining the current flow through said first circuit greater than the current flow through said load, said first circuit being effectively substantially electrically decoupled from the series circuit of said source of direct current voltage and said switching device when said switching device is being turned on or is on;

e. a second circuit connected to said first circuit and said switching device with means to supply electrical energy to said first circuit for the application in said first circuit of a voltage opposite in polarity to the potential of said source of direct current voltage to turn off said switching device;

f. said first and second circuits being connected to form a closed loop;

g. the accumulation of trapped energy in said first circuit being inhibited during the period said switching device is commutated; and h. a second source of direct current voltage connected to said second circuit to replenish energy losses consumed by said first circuit.

16. A circuit as claimed in claim 3 wherein said reactive element is a transformer with the primary windings thereof in said first circuit and with the secondary windings thereof returning trapped energy in said primary windings to said source of direct current voltage continuously until the next commutation cycle, said trapped energy being stored in said primary windings during the commutation period.

17. A circuit as claimed in claim 1 wherein said second circuit forms a low impedance path from said source of direct current voltage when said switching device is commutated to by-pass said switching device and thereby by-pass said load.

18. A circuit as claimed in claim 1 wherein said first circuit comprises an inductance coil connected in series with said source of direct current voltage and said switching device.

19. A circuit as claimed in claim 18 wherein said energy control means comprises resistance means connected in series with inductance coil.

20. A circuit as claimed in claim 10 wherein trapped energy stored in said first circuit during the period said switching device is commutated has excess trapped energy reclaimed by said second circuit for reuse during the succeeding cycle.

21. A circuit as claimed in claim 20 wherein the reclaimed energy is substantially the trapped commutation energy less losses consumed by said first circuit.

22. A circuit as claimed in claim 1 wherein said first circuit includes a free wheeling device for electrically decoupling said first circuit when said switching device is turned on and when said switching device is conducting.

23. A circuit as claimed in claim 10 wherein said first circuit includes a free wheeling device for electrically decoupling said first circuit when said switching device is turned on and when said switching device is conducting.

* * * * *